United States Patent [19]
Brown

[11] Patent Number: 4,890,714
[45] Date of Patent: Jan. 2, 1990

[54] CONVEYING SYSTEM

[76] Inventor: H. Gary Brown, 2009 S. Range Rd., Hammond, La. 70401

[21] Appl. No.: 225,639

[22] Filed: Jul. 25, 1988

Related U.S. Application Data

[63] Continuation of Ser. No. 829,795, Feb. 14, 1986, abandoned.

[51] Int. Cl.$^4$ .............................................. B65G 13/12
[52] U.S. Cl. .............................. 193/35 R; 193/35 A; 193/35 J; 198/538; 198/583
[58] Field of Search ................ 198/538, 583, 624, 632, 198/780; 193/35 R, 35 A, 35 J, 37

[56] References Cited

U.S. PATENT DOCUMENTS

| | | | |
|---|---|---|---|
| B 580,379 | 4/1976 | Bolton et al. | 193/35 R |
| 2,438,527 | 3/1948 | Werner | 193/35 R |
| 2,671,241 | 3/1954 | Starner | 198/836 X |
| 2,889,907 | 6/1959 | Sullivan | 193/35 R |
| 3,362,806 | 1/1968 | Brewin et al. | 65/350 |
| 3,739,904 | 6/1973 | Windstrup | 198/836 |
| 4,079,551 | 3/1978 | Bando | 198/626 X |
| 4,422,541 | 12/1983 | Lisec | 198/836 X |
| 4,765,273 | 8/1988 | Anderle | 198/624 X |

FOREIGN PATENT DOCUMENTS

| | | | |
|---|---|---|---|
| 0080375 | 1/1956 | Denmark | 193/35 R |
| 1066147 | 9/1959 | Fed. Rep. of Germany | 198/624 |
| 2245952 | 3/1973 | Fed. Rep. of Germany | 193/35 A |
| 2320493 | 3/1977 | France | 193/35 J |

*Primary Examiner*—Robert J. Spar
*Assistant Examiner*—Lyle Kimms
*Attorney, Agent, or Firm*—Pravel, Gambrell, Hewitt, Kimball & Krieger

[57] ABSTRACT

The system is a plurality of wall board conveying sections which when interconnected form the wall board conveying system for the distance desired. In the preferred embodiment, each section provides a horizontally extending track frame housing a plurality of spaced apart freely rotating roller members throughout its length. Adjacent each roller there is further provided a first pair of lower free rotating guide wheels making contact with the front and back side of the wall board as it is conveyed along the rollers. There is further provided a second upper pair of free rotating roller guide wheels extending a distance above the lower guide wheels to a point approximately above the mid-point of the wall board being conveyed on edge, the guide wheels also positioned in making contact with both the front and back side of the sheet of wall board, and supporting it on edge as it is being conveyed along the rollers. In addition, each section of the system is provided on its front end with a male connecting member which interlocks to a female connecting member on the subsequent section, thus providing a continuous track as the board is being conveyed.

8 Claims, 7 Drawing Sheets

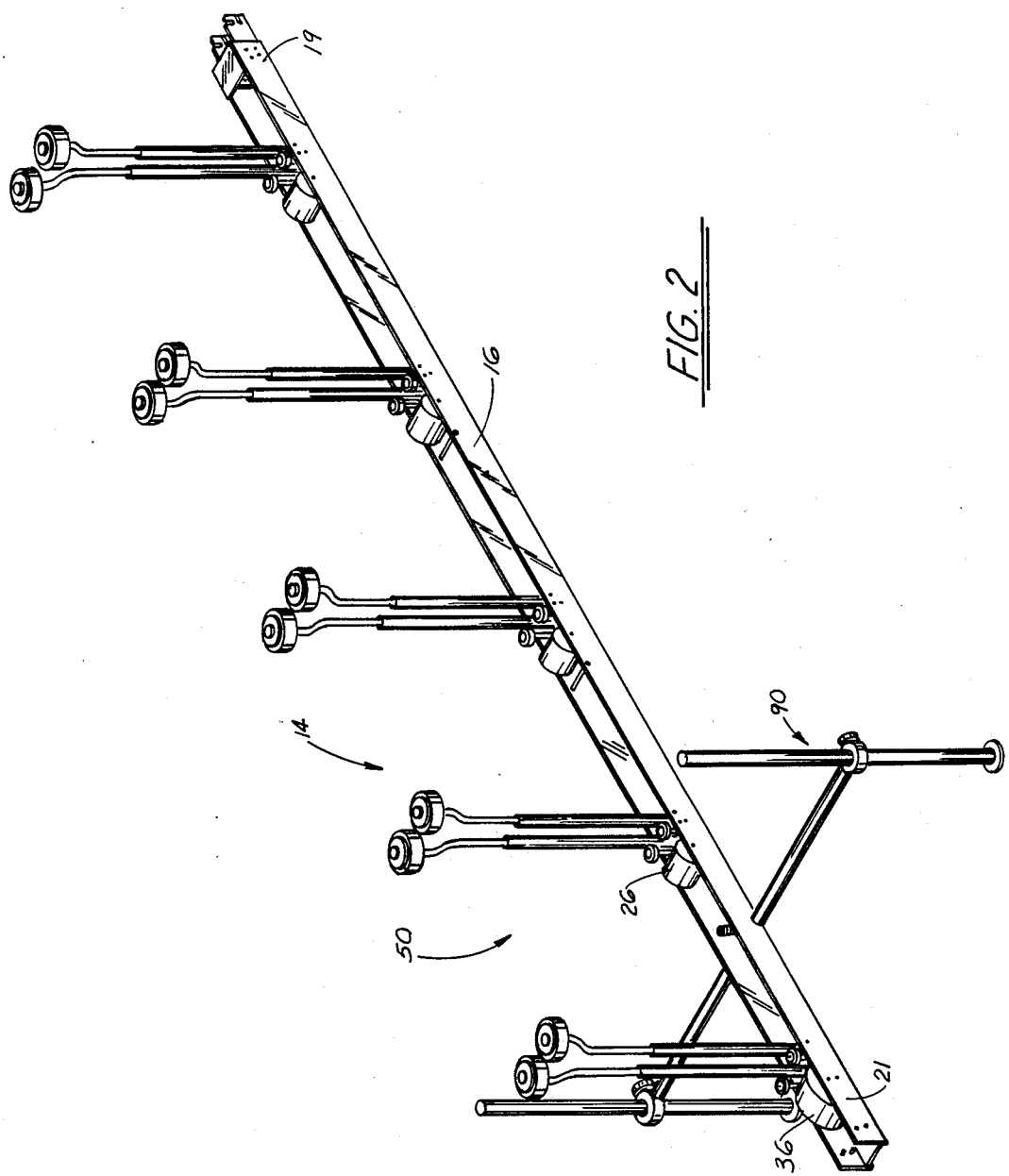

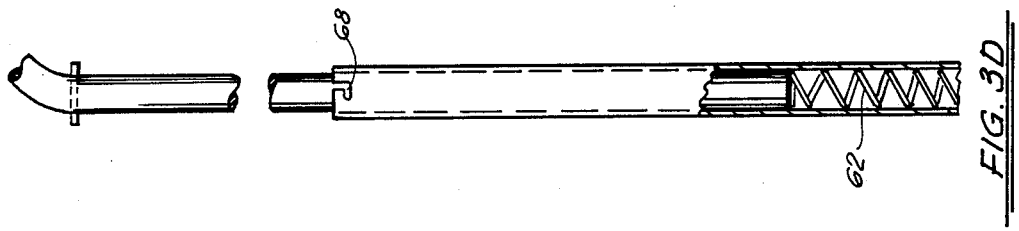
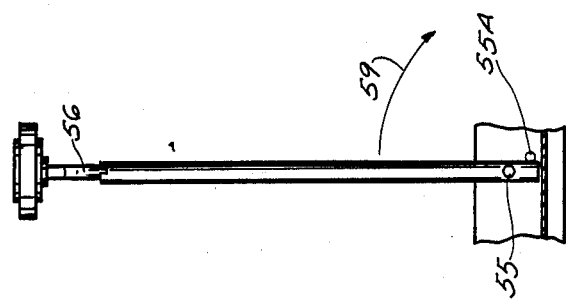
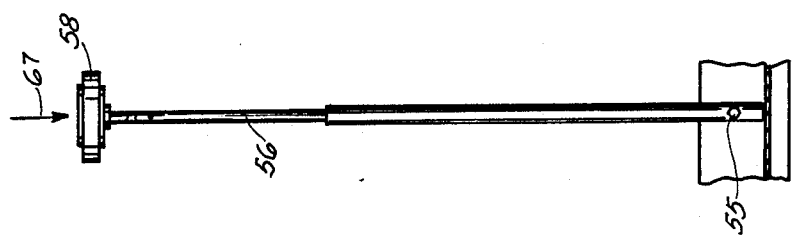
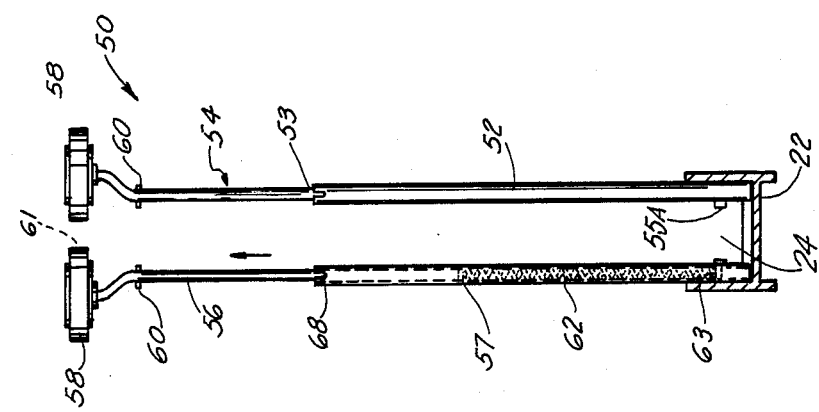

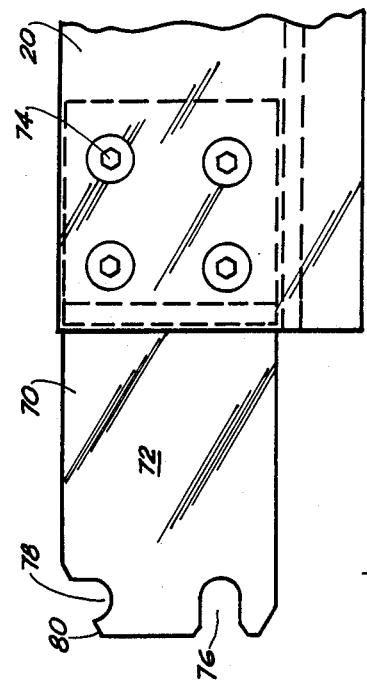
FIG. 5A
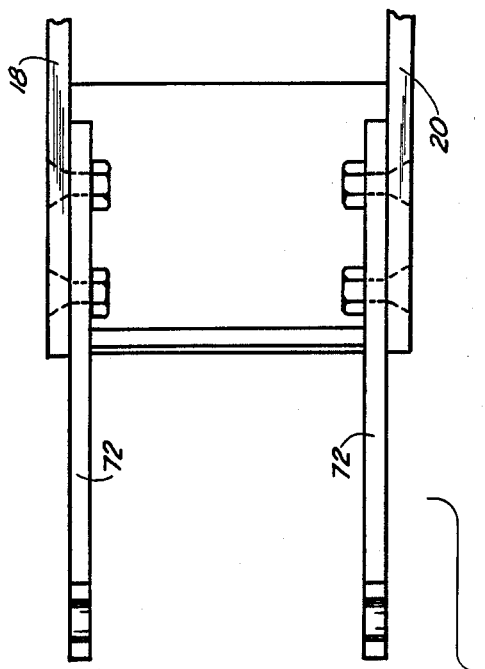
FIG. 5B
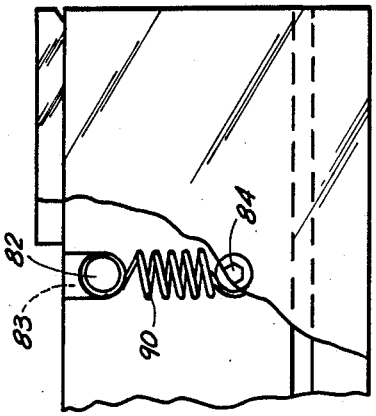
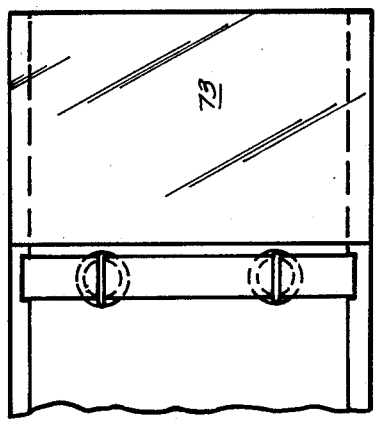
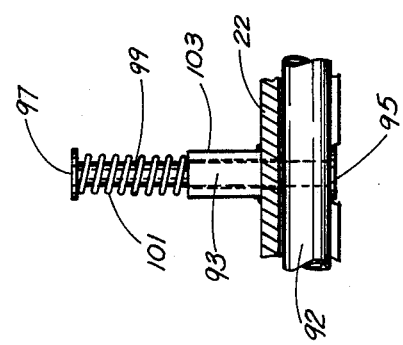
FIG. 8A
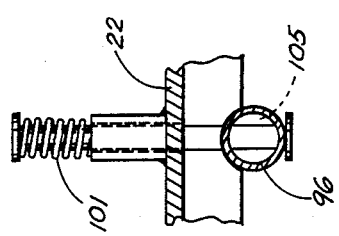
FIG. 8B

CONVEYING SYSTEM

This is a continuation of co-pending application Ser. No. 829,795, filed on Feb. 14, 1986, now abandoned.

BACKGROUND OF THE INVENTION

Field of the Invention

The present invention relates to a system for conveying items. More particularly, the system of the present invention relates to a system for conveying wall board, particle board, plywood, or other sheet material from one destination to another while the board being conveyed is placed on edge.

In the construction industry, particularly for homes or the like buildings, an important component of the construction of such a building is the construction of the exterior and interior walls of the building. In most cases, the interior walls are constructed of a material known as wall board or "sheet rock" which comprises the section of material normally 8' in length by 4' in width and of various thickness. The sheeted material is attached to the structural frame work of the walls, side by side, floated, and painted for achieving a continuous wall surface.

Likewise, other types of material such as plywood of various thickness are utilized in the construction of buildings for either the exterior of the building, the initial roof layer of the building or the like uses. Therefore, it can be easily forseen that the use of these types of materials in the construction of the home or more particularly in the construction of a larger building, can be of a great magnitude of sections of board, in order to complete the construction. In fact it is not unusual in the construction of an apartment complex or the like that hundreds of thousands of these particular pieces of materials are utilized into final construction.

As is often the case in the construction of a building or the like, the materials must be delivered to the building site at a particular time in the construction, so that the materials are not allowed to remain in the weather and perhaps be ruined. It is especially important, in the case of wall boards or sheet rock, that this material be placed out of the weather as soon as possible, in view of the fact that the materials constructed of a substance adhered between layers of paper, and when wet, becomes useless and must be discarded as waste.

In addition, this type of board depending on its thickness is quite heavy in weight, and since the most logical place to store the board would be in the confines of the structure once it has a roof place thereupon, it is necessary that the board reach the structure in order to be placed therein. Often times, because of inclement weather, trucks which are often times utilized to convey material to the job site, due to its weight may become bogged down in attempting to get the material into the building, and in most if not all instances, the access to the building is such that the wall boards can not be conveyed by vehicle, but must be manually carried into the building.

Therefore, there is a need for a system whereby the wall boards may be conveyed to the job site, when one wishes to, and the system may be dismantled quite easily so that it does not have to occupy the job site for a longer time needed. In addition, the system must be such that it can be in any size depending on the amount of distance that the boards must be conveyed to its final destination.

There have been patented systems which address the broad concept of conveying materials, the most pertinent as follows:

U.S Pat. No. 4,422,541 issued to Lisec entitled "Apparatus for Conveying Insulating Glass Panes", teaches the use of a conveyer system, which is adopted so that insulating compound on the edge of the glass does not make contact with the conveying belt. Further includes a plurality of backing rollers which are free rolling, and as the pane is moved along a continuous belt the glass does not make contact with the conveying belt.

U.S. Pat. No. 3,844,405 issued to Shufford, entitled "Quick Adjusting Guide Rail For Conveyer", teaches the use of an upright conveyer system. The invention addresses an adjustable screw mechanism for slidable adjusting the width of the guide rails for making it easier to adjust the width of the member.

U.S. Pat. No. 3,332,538 issued to Rice, entitled "Conveyer Structure", teaches the use of a conveyer system wherein the article being conveyed comes in direct contact with a drive chain as it is moving along.

U.S. Pat. No. 3,605,994, issued to Parlette, entitled "Unit Frame Assembly For Endless Belt Or Similar Conveyor", addresses the structure of a conveyer system having a unit framed assembly being of fabricated components.

U.S. Pat. No. 3,844,399 issued to Sellers, entitled "Log Conveying Apparatus", teaches the use of an apparatus having a series of members for guiding the log over a continuous chain, the guiding members being in a series of rotatably wheel members.

SUMMARY OF THE PRESENT INVENTION

The system of the present invention solves the problem of conveying sheets of wall board or the like to a job site in a simple and straightforward manner. What is provided is a plurality of wall board conveying sections which when interconnected form the wall board conveying system for the distance desired. In the preferred embodiment, each section provides a horizontally extending track frame housing a plurality of spaced apart freely rotating roller members throughout its length. Adjacent each roller there is further provided a first pair of lower free rotating guide wheels making contact with the front and back side of the wall board as it is conveyed along the rollers. There is further provided a second upper pair of free rotating roller guide wheels extending a distance above the lower guide wheels to a point approximately above the mid-point of the wall board being conveyed on edge, the guide wheels also positioned in making contact with both the front and back side of the sheet of wall board, and supporting it on edge as it is being conveyed along the rollers. In addition, each section of the system is provided on its front end with a male connecting member which interlocks to a female connecting member on the subsequent section, thus providing a continuous track as the board is being conveyed. Further, each section is provided with a pair of leg members, each leg member positioned vertically from an outer extending arm for maintaining each section a pre-determined distance above the level of the ground during the use of the system. Further, when the system is not in use, the leg portions of the leg assembly are removable, and the transverse bar members are stored in the underside of the track member. The upper extending rollers are folded downward to a position within the track member with the wheels removed therefrom position adjacent the track. In this manner, the system can be broken down and packaged in a confined area for reuse at a later time. Further there is provided a system for slowing the conveying of the board along the track should the conveying of the board reach a speed above a certain point.

Therefore, it is a primary object of the present invention to provide a conveying system for wall boards or other sheet material while the wall boards are maintained on edge during the conveying of the board.

It is a further principal object of the present invention to provide a system comprised of a plurality of sections interconnectable to provide a continuous track for conveying the section of wall boards or other sheet material thereupon.

It is still a further object of the present invention to provide a wall board conveying system which is easily assembled, light-weight, and functionally simple in order to convey wall boards or other sheet material from one destination to another.

It is still a further object of the present invention to provide a wall board conveying system which can be utilized in a plurality of settings, and can be assembled to a desired distance for conveying.

It is still a further object of the present invention to provide a wall board or other sheet material conveying system which can be assembled and disassembled quite quickly and easily, and can be stored in a confined area.

BRIEF DESCRIPTION OF THE DRAWINGS

For a further understanding of the nature of the objects of the present invention, reference should be had to the following detailed description, taken in conjunction with the accompanying drawings, in which like parts are given like reference numerals and, wherein:

FIG. 2 illustrates an overall perspective view of one section in the perferred embodiment of the system of the present invention;

FIGS. 3A-3D, illustrate the upper roller components in the perferred embodiment of the system of the present invention;

FIGS. 5A-5C, illustrate views of the locking mechanisms between sections in the preferred embodiment of the system of the present invention;

FIGS. 8A-8B, represent cross-sectional views of the leg assembly storage mechanism in the preferred embodiment of the system of the present invention.

DETAILED DESCRIPTION OF THE PERFERRED EMBODIMENT

Figure 1:
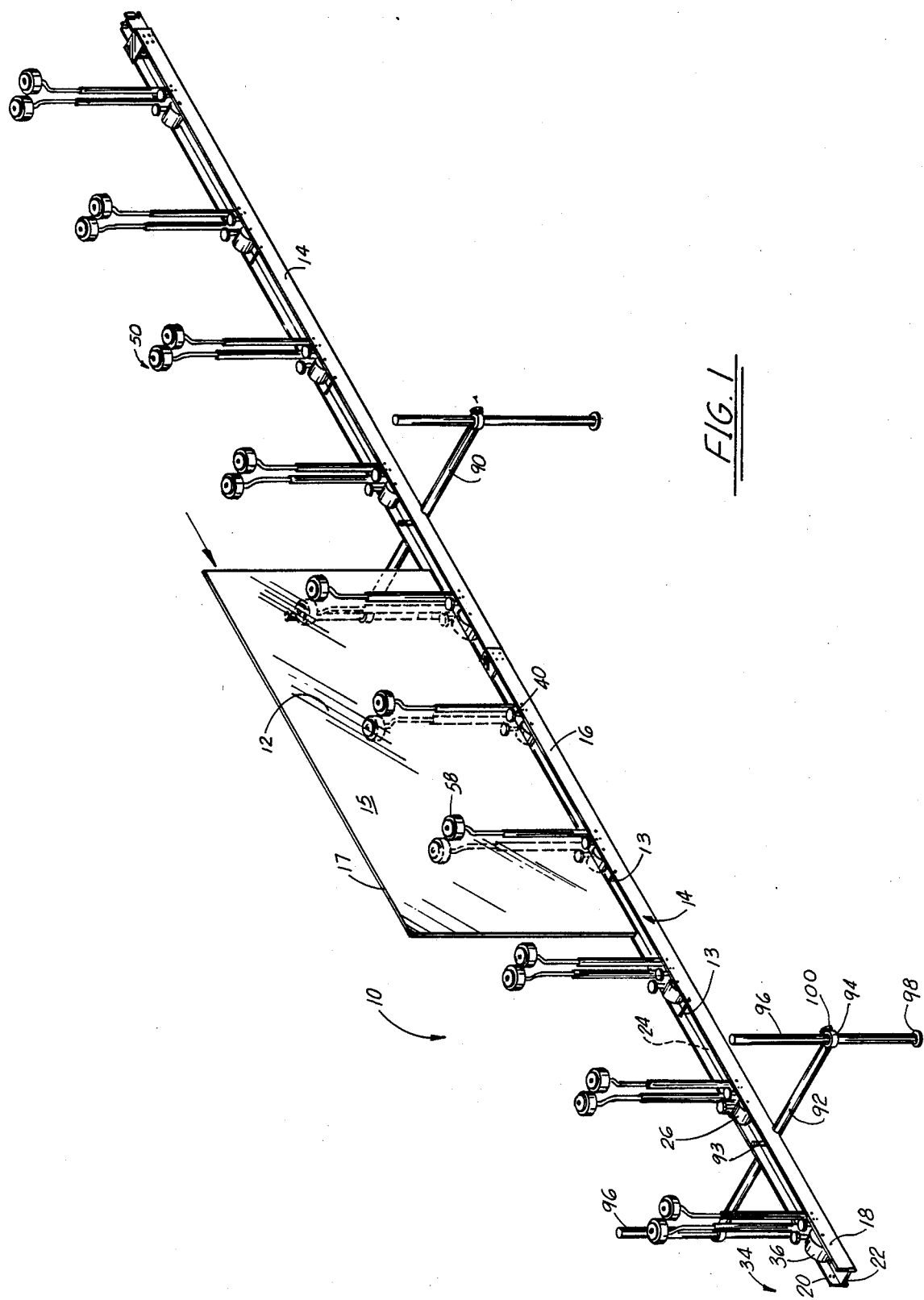
FIG. 1, is an overall perspective view of the preferred embodiment of the system of the present invention.

The perferred embodiment of the system of the present invention is illustrated in FIGS. 1-8B, with an overall view of the system illustrated in FIG. 1 by the numeral 10. As seen in the Figures, conveyor system 10 is utilized primarily in the conveying of a section of wall board or plywood 12 on edge from one destination to a second destination while utilizing a system 10. (For purposes of discussion, wall board or plywood shall be utilized, however, it should be understood that the system can be utilized for conveying any sheet material that can be conveyed on edge such as fiberglass, glass, paneling, or the like.) The system 10 would generally comprise a plurality of conveyor sections 14, with two of the sections 14 shown interconnected in FIG. 1 and an overall respective view of a single section 14 as illustrated in FIG. 2. In general, each individual section 14 would comprise a track frame member 16 which would generally be constructed with a first and second side walls 18 and 20 respectively, and a floor portion 22 intermediate side walls 18 and 20, so that there is provided a channel space 24 formed by the side walls 18, 20 and floor member 22. As seen in the FIGURES, frame member 16 would further house a plurality of free rotating roller members 26, the structure of which can be seen more clearly in FIG. 6C and 6D. Each of the free roller members 26 rotate around an axle 28 which extends onto a bracket 30 attached through bolts 32 or the like to wall members 18 and 20 respectively. As is seen in FIG. 6C, each roller member 26 is positioned a distance from floor member 22 so that the edge of roller 26 does not make contact with floor member 22 during use of the apparatus. At the rear end portion 34 of each section 14, there is provided a primary roller 36 the structure of which is illustrated in FIGS. 6A and 6B, and will be discussed further.

As is seen in the Figures, particularly FIG. 1, secondary rollers 26 and primary roller 36 provides a track upon which the lower edge 13 of wall board member 12 is moved along dring the conveying process. Of course as was stated earlier, secondary rollers 26 and primary rollers 36 are usually free rolling rollers, and rotate as a result of wall board member 12 being moved thereupon, unless the wall board is traveling at a certain speed wherein the primary rollers 36 would serve as a braking mechanism for slowing the speed, the features of which will be discussed further.

The system further provides a means for both maintaining the section of wall board 12 in the vertical position during the conveying process, as seen in FIG. 1, and for both maintaining the wall board section 12 in a straight path along the sections of the system during the process. This means comprises initially a plurality of lower free standing roller members 40 which, are illustrated overall views in FIGS. 1 and 2A and in detail view in FIG. 2B. As seen in the FIGURES, lower free standing guide rollers 40 are positioned within channel 24 for providing means for making contact with the front face 15 and rear face 17 (not illustrated) of wall board 12 while wall board 12 is moved along the system. Each guide roller 40 is mounted upon a vertically positioned axle 42, (See FIG. 7), with axle 42 being rigidly connected to a mounting bracket 44, the mounting bracket 44 connected to and extending also channel 24 and its edges rigidly connected to wall 18 and 20 of frame 14. Each of the free rolling members 40 are mounted atop axle 42 via a bolt 46 or the like so that the member 40 is free to rotate horizontal to the frame 14 as the board 12 is moved therethrough. In overall function, the primary function of the guide rollers 40 is to assure that the lower edge of wall board 12 is maintained substantially positioned within the center of secondary rollers 26 and primary rollers 36. For purposes of the system, the position of rollers 40 are stable, and do not change positions as do other features in the system as will be discussed further.

In addition to the lower guide means as discussed previously, there is further provided a plurality of upper guide members for assuring that not only the wall board is maintained along the track 14 as it is being conveyed, but also that the wall board 12 is maintained in the upright position as it is moved along. This is assured by the upper guide roller system 50, which is illustrated in the overall view in FIGS. 1 and 2A and in detail view in FIGS. 3A-3D. As seen in the Figures, the upper roller system 50 comprises a lower vertically positioned housing 52 which is secured to the inner face of walls 18 and 20 of frame 13 through bolting or the like, with the lower end of housing 52, when housing 52 is in the vertical position, making contact with stop 55A, and therefore being maintained in the vertical position. Each housing 52 is substantially a cylindrical housing having an inner bore therewithin. There is further provided vertical guide members 54 which substantially comprise vertically inclined arm 56 of a diameter that is accommodated within the bore 53 of housing 52. As seen in FIG. 3A, upstanding arm member 56 slidable engages within housing 52 while in use.

Guide mechamism 50 further provides first and second free standing rollers 58 again substantially horizontal to the plain of track 14, and mounted upon arm 56, so that each roller 58 is positioned to make contact with the front face 15 and rear face 17 of wall board section 12 as it is moved along the system.

As is seen in the Figures, unlike lower guide rollers 40, upper guide rollers 58 make contact with the section of board 12 at a point substantially above the mid-way point of the width of the board, so that the board is held upright as seen in FIGURE 1.

In view of the fact that the housings 52 are mounted within channel 24 of frame 14, the upper portion of upper guide mechanism 50 is constructed such that the free rotating guide members 58 are maintained substantially apart at least the distance of the wall board thickness so that the wall board is able to travel therebetween. That is accomplished by guide arm 56 having a bend 60 within its upper portion so that the arm bends outwardly to provide the necessary space 61 between the free rotating members as seen particularly in 3A.

Further included in the structure of upper guide mechanisms 50 is a means for allowing guide arms 56 to be retreated into bore 53 and locked in place while the system is being stored away. As seen in FIGS. 3A-3D, this is accomplished by providing an internal spring 62 in the space between the floor 63 of housing 52 and the lower end 57 of arm 56 while it is placed in position within bore 53. Further, at a point just below the curve 60 of arm 56 there is providing a locking pin 66 extruding from the wall thereof. Therefore, when the system is to be stored away downward pressure is placed on roller 58 in the direction of arrow 67 as seen in FIG. 3B, and the arm 56 is thus pushed against the bias of spring 62 to a position as seen in FIG. 3C. Upon being placed in that position, lock pin 66 is then engaged into L slot 68, and rotated slightly, so that once placed in the L of 68, the wheel is locked in the down position for storage. The need for this down position will be more fully explained when the storage of the system is further discussed. Of course, as seen in the FIGS. 3A-3D, when the arm 56 is rerotated back to its position to where it can move out of slot 68, spring 62 expands to its fullest extent and arm 56 moves into the functioning position as seen in FIGS. 3A and 3B.

A discussion will now be had of the means for interlocking the individual sections 14 into the continuous wall board conveying system as seen in FIG. 1. This locking means is seen more clearly in detail in FIGS. 5A-5C. As seen in the Figures, the locking means comprises a male member 70 which extrudes from the front end 19 of section 14, and comprises a pair of flat plates 72 each of plate 72 being rigidly attached through bolts 74 to wall portions 18 and 20 respectively, so that a major portion of plate 72 extrudes forwardly from the front edge of walls 18 and 20. Also, there is further included a vertical support plate 73 expanding between wall portions 18 and 20 for adding further support to the locking mechanism. Plate 72 comprises on its frontward most locking edge a lower U shaped groove 76, and a vertically inclined J groove 78 having a leading bevealed edge 80 during the interlocking. In top view, one can readily see that each plate 72 is mounted to walls 18 and 20 as was described earlier.

In completing the locking mechanism, reference will be now made to the portion of the locking mechanism located on the rear end portion 21 of each section 14 which must cooperate with plate 72 as it moves into locking position. This means for completing the locking mechanism, includes a stationary rod member 84 mounted across base 24 between walls 18 and 20. Rod 84 to be accommodated with U slot 76 as plate 72 is moved in position. Likewise, there is further included an upper member 82 which is likewise a bar extending between walls 18 and 20. However, rod 82 is movable within a slot 83 and is held in the down position as seen in FIG. 5A, via spring 90 interconnecting stationary rod 84 and movable rod 82. Therefore, rod 82 moves against the bias of spring 90. hen the sections are being locked into position, plate 72 is slid so that stationary rod 84 is engaged into slot 76, and leading edge 80 of plate 72 forces rod 82 to move slightly upwards so as to allow edge 80 to move thereby and rod 82 would then slip down into J slot 78 into plate 72 in the locked position as seen in FIG. 5A. Therefore, the sections would be lockingly engaged. In removal therefrom, pin 82 must be moved slightly upwardly so as to manually disengage from J slot 78 and clear edge 80 so that locking plate 72 can be backed away from pins 82 and 84.

Figures 6C, 6D:
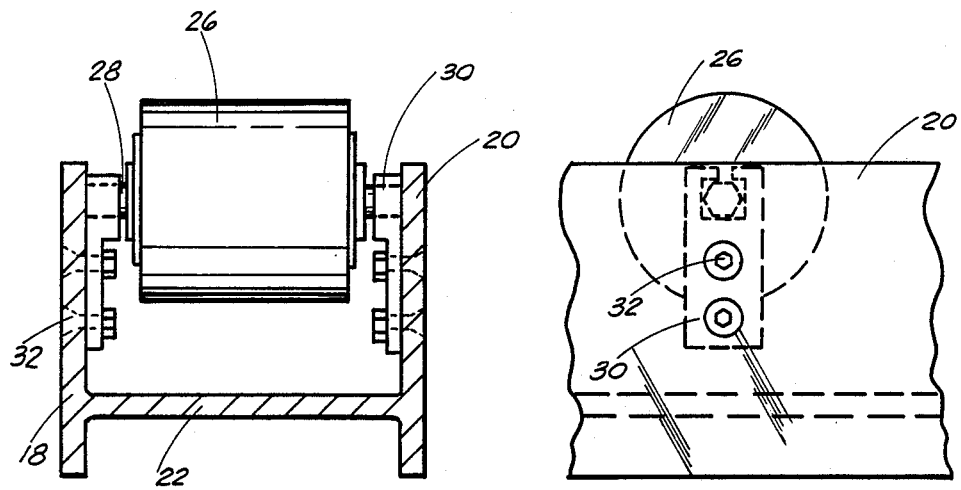
FIGS. 6C-6D, represent the stationary rolling members in the preferred embodiment of the system of the present invention.
Figure 6B:
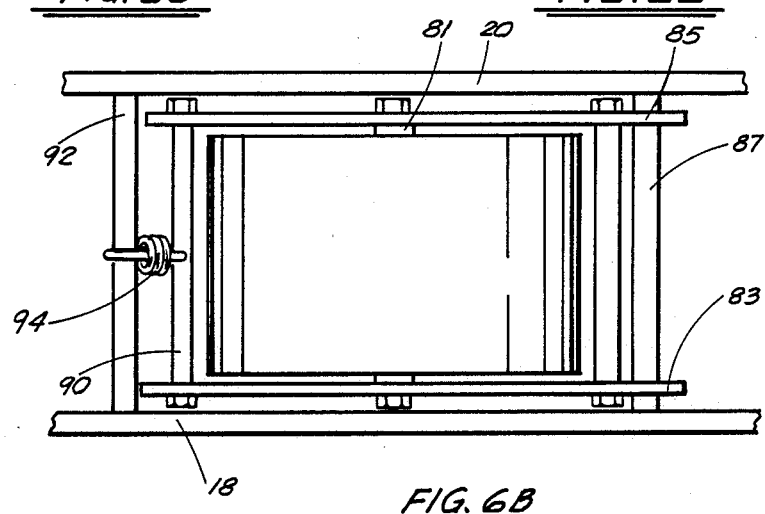
FIGS. 6A-6B, represent breaking mechanism rolling members in the perferred embodiment of the system of the present invention.
Figure 6A:
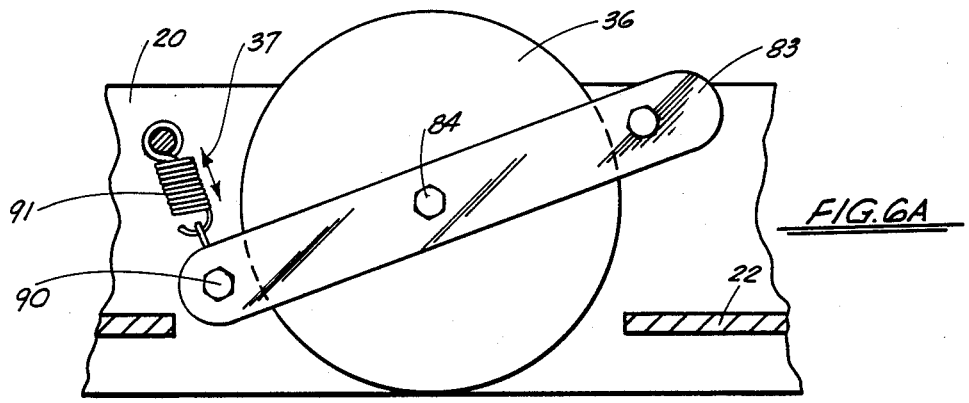

FIGS. 6A and 6B represent primary roller 36 which is mounted upon axle 81 between first movable mounting plate 83 and second movable mounting plate 85, the top ends of which are mounted onto pin 87 which spans between side walls 18 and 20. Therefore, primary guide roller 36 is able to move upward and downward in the direction of arrow 37 as seen in FIG. 8A. At the lower end of mounting plate 83 and 85 there is further provided a pin member 90 as seen in FIG. 6B in top view, which is rigidly attached between plates 83 and 85. There is further provided an upper rod member 92 extending intermediate walls 18 and 20, with a spring member 94 interconnecting rod member 92 and axle 90 to maintain roller member 36 in the up position as seen in FIG. 6A. The roller member as seen particularly in FIGS. 6A and 6B, rises above frame 16, as seen in the FIGURES, a distance greater than secondary rollers 26. This is to assure that as a section of wall board is moved along each section of the apparatus, that it is guaranteed that it will make contact with primary roller 36 during its movement. Since primary roller 36 is spring loaded, when wall board member does make contact with it, the weight of the wall board member will bring it down to up position substantially equal to the position of secondary rollers 26, and it will continue on its track.

It is perferred that the section of wall board 12 being conveyed along the system make contact with at least a single primary roller 36 during a run over each section 14, so that primary roller 36 may serve as a means for providing a braking or slowing of the movement of the wall board during transport, should one want to slow its movement along the track 14. In the perferred embodiment, primary roller 36 is known in the art as a roller having an internal gravity brake mechanism, so that upon rotation of roller 36 on its, axis to a certain RPM, the internal braking mechanism is centripetally activated, and the internal braking shoes frictionally engaged the internal wall of roller 36, and slow it in its rotation, thus slowing the movement of the board as it travels thereupon. Of course, upon the internal braking mechanism frictionally engaging the wall of roller 36, the board likewise would slow in its movement, and in the case of board being transferred at a rate greater than the system is able to accommodate, the system would automatically compensate for the higher speed, and therefore slow the movement of the board to a pace that is perferred in the use of the system. For purposes of this apparatus, the internal mechanism of braking roller 36 is not being illustrated since it is a typical gravity braking roller which is well known in the art.

Figure 4:
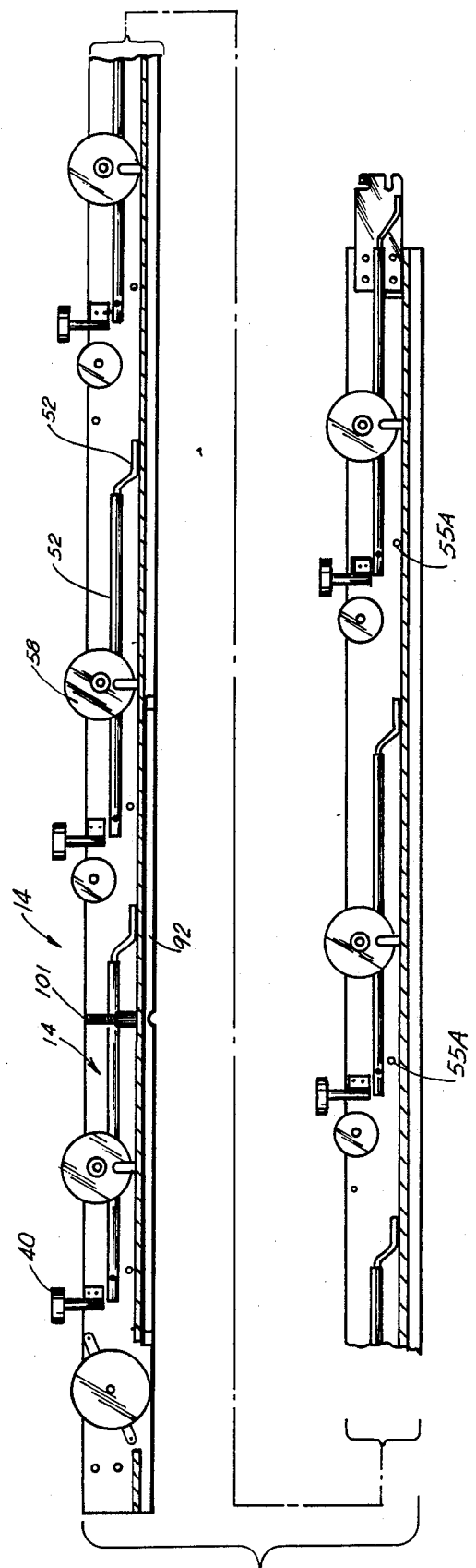
FIG. 4, illustrates a side view of a section in position for storage of the system of the present invention.
Figure 5C:
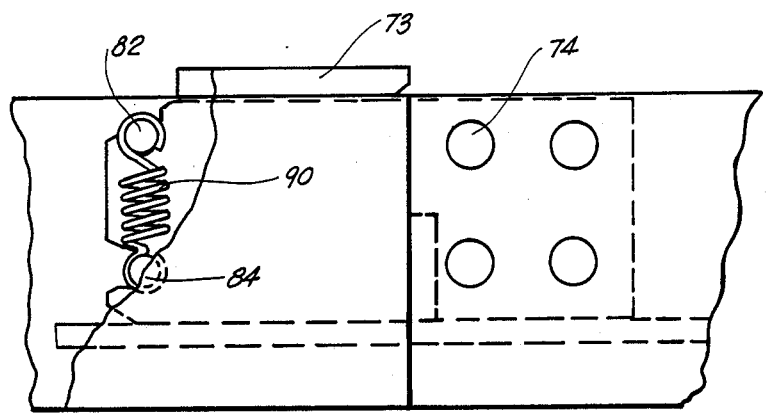
Figure 7:
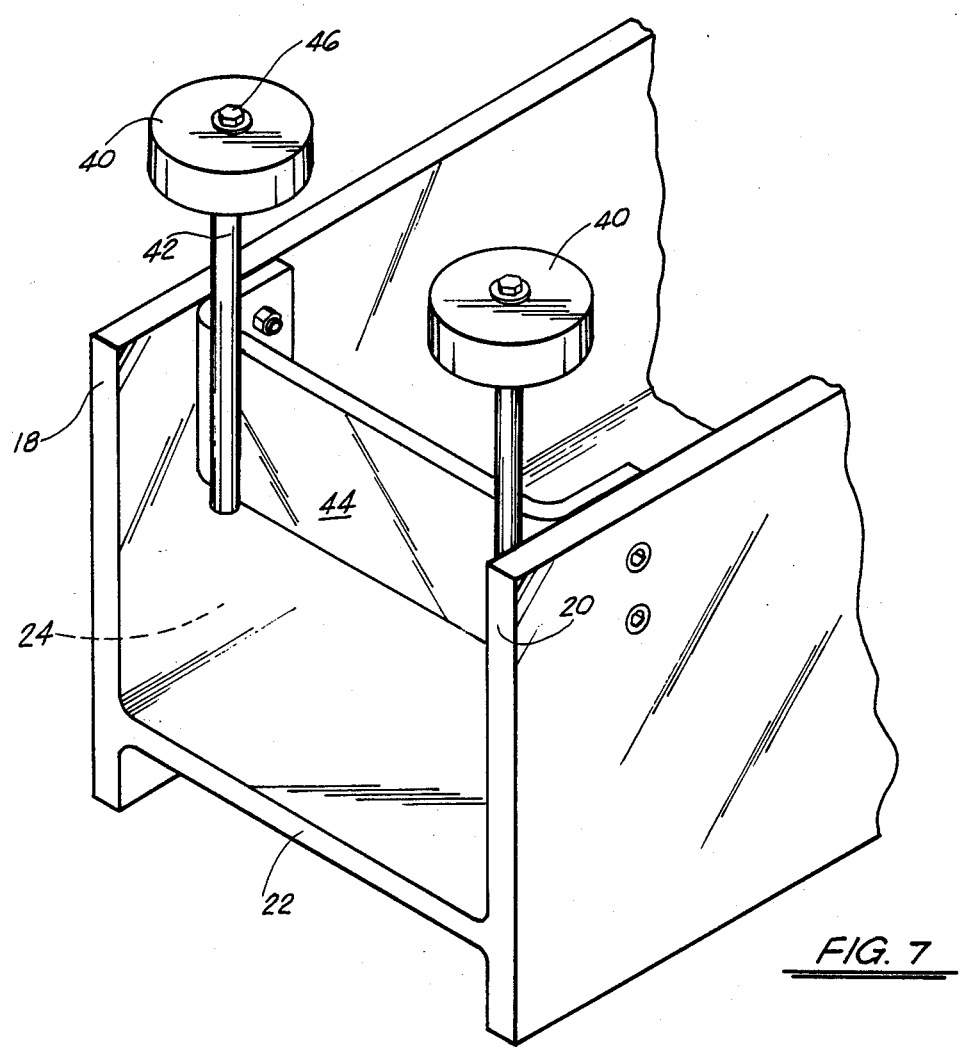
FIG. 7, represents a close-up perspective view of the lower stationary guide rollers in the perferred embodiment of the system of the present invention.

Since the apparatus can be fully disassembled, FIG. 4 illustrates the apparatus in the position for storage. As seen in the Figure, in this position, lower guide rollers 40 as were discussed earlier, are maintained in their upright position extending upward from frame 14 due to their rigid attachment thereto. However, in view of the fact that upper guide mechanism 50 is extruding quite a distance from frame 14, upper guide mechanism 50 would be placed in the position as was discussed earlier by moving arm 56 downward against the bias of spring 62 and locking it in place within L groove 68 as seen in FIG. 3D. In this position the arm members are substantially shorter in height as seen in FIG. 3C, than in the position as seen in FIGS. 1 and 2. Following that step, housings 52, since they are simply mounted onto walls 18 and 20 as seen in FIGS. 3A and 3B via a single housing bolt 55, housings 52 are able to be rotated downwardly as seen in arrow 59 in FIG. 3C to the position substantially contained within channel 24 as seen in FIG. 4. Prior to the placement of housing 52 containing arm 56 in that position, upper roller 58 is removed therefrom and placed in a position between wall 18 or 20 and housings 52. Therefore, as seen in FIG. 4, the apparatus has become to occupy an area slightly larger in the area than the area occupied by the frame 14 without the guide members thereupon. In that position, therefore, the apparatus is able to be stored very compactly. Of course, following storage and placement into use, housings 52 are simply rerotated to the upright position against stop 55A, wheel 58 is placed upon arm 56, arm 56 is then released from its locking position within J slot 68 to fully extend in the operable position as seen in FIG. 3A, and the sections 14 are then reinterlocked and the system is to be utilized once more.

An additional feature of the system is a means for maintaining the system at a level above the ground where it is most convenient for use. This is provided by the plurality of leg members 90 as seen in FIGS. 1 and 2. The leg means 90 would simply comprise a laterally extending round bar 92 which is mounted through a spring loaded bolt mechanism 93 on the under side of floor 22 with an equally distant portion of bar 92 extending outward from either edge of frame 14. Each arm portion 92 contains on its end portion a circular metal housing 94 which would slightable engage a leg member 96 having a foot portion 98. Upon placing the leg member to a height suitable, a friction engaging bolt 100 is then heightened against the edge of leg 96, and the legs are positioned at the proper height.

One will note from FIG. 1 that a pair of legs 96 extruding from bar 92 is housed on each section 14 of the system, so that when one wishes to store the apparatus, bolt 100 is loosened, and legs is slid from housing 94 for removal therefrom. For further storage of the leg system, reference should be made to FIGS. 8A and 8B. FIG. 8A laterally extending bar 92 is illustrated as being in the transverse position the low floor portion 22 and maintained in the position via spring loaded bolt 93, which has a first lower end portion 95 and a second upper face 97 with the shaft 99 therebetween. The upper portion of shaft 99 is enclosed in a spring 101, which is situated between the upper face 97 of bolt 93 and a lower housing 103. Therefore, spring transverse member 92 is held in place against floor portion 22 against a bias of spring 101 during use. Upon removal of the legs 96 therefrom, the references made to FIG. 8B, transverse member is rotated 90 degrees as seen in FIG. 8B, and upon being in position lengthwise along floor 22, the spring 101 forces it to become housed within U shaped recessed 105 beneath floor member 22, for storage. Therefore, as further seen in FIG. 4, the transverse bar 93 is housed within the recess below floor 22 as defined by side walls 18, 20 and floor member 22. Of course upon reuse of the system, transverse member 92 is simply pulled down against the bias of spring 101 and rotated to the position as seen in FIG. 1, where again it is placed in position for use.

Overall, the system of the present invention solves the problems as being lightweight, easy to store, easy to assembly and disassembly, and allowing the conveying of what would normally be heavy wall board as a continuous system in order to move the wall board from one point to a second point on the job site, without the need for the strain of manually carrying the board on the job site. Overall the system could be constructed of lightweight metal and would be easy to maintain and easy to accommodate various sizes of wall board, plywood, particle board or other like board material.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:
1. A system for transporting wall board or like material on edge, comprising:
   (a) a frame extending substantially horizontally, including at least two interconnectable sections;
   (b) a plurality of rollers spaced along the length of the frame for defining a continuous track upon which the wall board is conveyed on edge;
   (c) a first, lower plurality of pairs of rollers spacedly positioned up from the frame, each pair of rollers making contact with the front and rear face of the sedtions of wall board at a point adjacent the frame as the wall board is conveyed along the rollers;

(d) a second, upper plurality of pairs of rollers mounted on vertical arms extending upward from the frame so that at least two pairs of rollers make contact with the front and rear face of the wall board at all times during transport of the wall board, the point of contact being substantially midway along the width of the wall board for maintaining the wall board in the upright position on edge while being conveyed, each vertical arm having an upper portion and including a bend in its upper portion to allow the two rollers in each pair of rollers in the second plurality of pairs of rollers to laterally separate a sufficient distance to allow the wall of board to pass between the two rollers;

(e) means on each of the sections of the system to engage one another for providing the continuous track upon which the wall board is conveyed;

(f) means for positioning the second plurality of rollers to a position substantially parallel with the length of the frame so that the sections may be packed within a confined area during storage.

2. The system in claim 1, further comprising leg members movable from a first position for maintaining the frame at a desired point above the surface of the ground to a second position stored within the confines of the frame.

3. The system in claim 1, wherein the number of sections that may be interconnected to other sections is unlimited and can form a system of any predetermined distance.

4. The system in claim 1, wherein the rollers within the frame are spaced apart so that the edge of the wall board at all times during conveying is making contact with at least three of the rollers.

5. A system for transporting wall board or like material on edge, comprising:

(a) a frame extending substantially horizontally, including at least two interconnectable sections;

(b) a plurality of rollers spaced along the length of the frame for defining a continuous track upon which the wall board is conveyed on edge;

(c) a first lower plurality of pairs of rollers spacedly positioned up from the frame, each pair of rollers making contact with the front and rear face of the sections of wall board at a point adjacent the frame as the wall board is conveyed along the rollers;

(d) a second, upper plurality of pairs of rollers mounted on vertical arms extending upward from the frame so that at least two pairs of rollers make contact with the front and rear face of the wall board at all times during transport of the wall board, the point of contact being substantially midway along the width of the wall board for maintaining the wall board in the upright position on edge while being conveyed, each vertical arm having an upper portion and including a bend in its upper portion to allow the two rollers in each pair of rollers in the second plurality of pairs of rollers to laterally separate a sufficient distance to allow the wall board to pass between the two rollers; and (e) means on each of the sections of the system to 6. The system in claim 5, further comprising leg members movable from a first position for maintaining the frame at a desired point above the surface of the ground to a second position stored within the confines of the frame.

7. The system in claim 5, wherein the number of sections that may be interconnected to other sections is unlimited and can form a system of any predetermined distance.

8. The system in claim 5, wherein the rollers within the frame are spaced apart so that the edge of the wall board at all times during conveying is making contact with at least three of the rollers.

* * * * *